US009479456B2

(12) United States Patent
Hutton et al.

(10) Patent No.: US 9,479,456 B2
(45) Date of Patent: Oct. 25, 2016

(54) PROGRAMMABLE LOGIC DEVICE WITH INTEGRATED NETWORK-ON-CHIP

(71) Applicant: Altera Corporation, San Jose, CA (US)

(72) Inventors: Michael David Hutton, Mountain View, CA (US); Herman Henry Schmit, Palo Alto, CA (US); Dana How, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 227 days.

(21) Appl. No.: 14/066,425

(22) Filed: Oct. 29, 2013

(65) Prior Publication Data

US 2014/0126572 A1 May 8, 2014

Related U.S. Application Data

(60) Provisional application No. 61/721,844, filed on Nov. 2, 2012.

(51) Int. Cl.
*H04L 12/933* (2013.01)
*G06F 15/78* (2006.01)

(52) U.S. Cl.
CPC ......... *H04L 49/109* (2013.01); *G06F 15/7825* (2013.01)

(58) Field of Classification Search
CPC ...... G06F 13/10; G06F 13/12; G06F 13/122; G06F 13/124; G06F 12/126; G06F 12/128
See application file for complete search history.

(56) References Cited

U.S. PATENT DOCUMENTS

| | | | |
|---|---|---|---|
| 6,014,038 A | 1/2000 | How et al. | |
| 6,223,313 B1 | 4/2001 | How et al. | |
| 6,242,767 B1 | 6/2001 | How et al. | |
| 6,611,932 B2 | 8/2003 | How et al. | |
| 6,613,611 B1 | 9/2003 | How et al. | |
| 6,690,194 B1 | 2/2004 | How et al. | |
| 6,954,917 B2 | 10/2005 | How et al. | |
| 7,557,605 B2 | 7/2009 | D'Souza et al. | |
| 7,902,862 B2 | 3/2011 | How et al. | |
| 7,944,236 B2 | 5/2011 | How et al. | |
| 2004/0049672 A1* | 3/2004 | Nollet et al. | 713/100 |
| 2005/0249220 A1* | 11/2005 | Olsen et al. | 370/395.4 |
| 2011/0149735 A1* | 6/2011 | Mangano et al. | 370/235 |

OTHER PUBLICATIONS

Roman Gindin, Israel Cidon and Idit Keidar, NoC-Based FPGA: Architecture and Routing, Proceedings of the 2007 Networkd on Chips Conference, pp. 253-261, May 9, 2007.*
Evgeny Bolotin, Israel Cidon, Ran Ginosar, Avinoam Kolodny, QNoC: QoS architecture and design process for network on chip, Journal of Systems Architecture, 2004, pp. 105-128.*
Author Unknown, My First FPGA Design Tutorial, pp. 1-48, Jul. 2008.*

(Continued)

*Primary Examiner* — Christopher Crutchfield
(74) *Attorney, Agent, or Firm* — Fletcher Yoder, P.C.

(57) ABSTRACT

Systems and methods for providing a Network-On-Chip (NoC) structure on an integrated circuit for high-speed data passing. In some aspects, the NoC structure includes multiple NoC stations with a hard-IP interface having a bidirectional connection to local components of the integrated circuit. In some aspects, the NoC stations have a soft-IP interface that supports the hard-IP interface of the NoC station.

20 Claims, 14 Drawing Sheets

(56) References Cited

OTHER PUBLICATIONS

Guohai Zheng, Huaxi Gu, Yintang Yang, Kerning Du, Shilong Xu, Design and Implementation of a QoS Router on FPGA, Proceedings of the 2011 International Conference on Computer Science and Network Technology, pp. 1837-1840, Dec. 26, 2011.*

T. Fisher, FPGA Crossbar Switch Architecture for Partially Reconfigurable Systems, PhD Thesis, Mar. 7, 2010, pp. 1-64.*

Theodore Marescaux, Andrei Bartic, Dideriek Verkest, Serge Vernalde, and Rudy Lauwereins, Interconnection Networks Enable Fine-Grain Dynamic Multi-tasking on FPGAs, LNCS Journal, pp. 795-205, 2002.*

Roman Koch, Thilo Pionteck, Carsten Albrecht, and Erik Maehle, An Adaptive System-on-Chip for Network Applications, Proceedings of the 20th International Parallel and Distributed Processing Symposium, pp. 1-8, 2006.*

Dirk Koch, Christian Haubelt, and Jurgen Teich, Efficient Reconfigurable on-chip Busses for FPGAs, Proceedings of the 16th International Symposium on Field-Programmable Custom Computing Machines, pp. 287-290, 2008.*

Ankur Agarwal, Cyril Iskander and Ravi Shankar, Survey of Network on Chip (NoC) Architectures & Contributions, Journal of Engineering, Computing and Architecture, pp. 1-15, 2009.*

Thilo Pionteck, Roman Koch, and Carsten Albrecht, Applying Partial Reconfiguration to Networks-on-Chips, Proceedings of the 2006 International Conference on Field Programmable Logic and Applications, pp. 1-6, 2006.*

Ye and Rose "Using Bus-Based Connections to Improve Field-Programmable Gate Array Density for Implementing Datapath Circuits," Int'l Symposium on FPGAs, 2005, pp. 3-13.

Trimberger et.al. "A Time Multiplexed FPGA," Int'l Symposium on FPGAs, 1997 pp. 22-28.

\* cited by examiner

PROGRAMMABLE LOGIC DEVICE WITH INTEGRATED NETWORK-ON-CHIP

CROSS-REFERENCE TO RELATED APPLICATIONS

This application claims the benefit of, and priority to, U.S. Provisional Application No. 61/721,844, filed Nov. 2, 2012, the disclosure of which is incorporated herein by reference in its entirety.

BACKGROUND OF THE DISCLOSURE

Existing integrated circuits such as programmable logic devices (PLDs) typically utilize "point-to-point" routing, meaning that a path between a source signal generator and one or more destinations is generally fixed at compile time. For example, a typical implementation of an A-to-B connection in a PLD involves connecting logic areas through an interconnect stack of pre-defined horizontal wires. These horizontal wires have a fixed length, are arranged into bundles, and are typically reserved for that A-to-B connection for the entire operation of the PLD's configuration bitstream. Even where a user is able to subsequently change some features of the point-to-point routing, e.g., through partial recompilation, such changes generally apply to block-level replacements, and not to cycle-by-cycle routing implementations.

Such existing routing methods may render the device inefficient, e.g., when the routing is not used every cycle. A first form of inefficiency occurs because of inefficient wire use. In a first example, when an A-to-B connection is rarely used (for example, if the signal value generated by the source logic area at A rarely changes or the destination logic area at B is rarely programmed to be affected by the result), then the conductors used to implement the A-to-B connection may unnecessarily take up metal, power, and/or logic resources. In a second example, when a multiplexed bus having N inputs is implemented in a point-to-point fashion, metal resources may be wasted on routing data from each of the N possible input wires because the multiplexed bus, by definition, outputs only one of the N input wires and ignores the other N−1 input wires. Power resources may also be wasted in these examples when spent in connection with data changes that do not affect a later computation. A more general form of this inefficient wire use occurs when more than one producer generates data that is serialized through a single consumer, or the symmetric case where one producer produces data that is used in a round-robin fashion by a two or more consumers.

A second form of inefficiency, called slack-based inefficiency, occurs when a wire is used, but below its full potential, e.g., in terms of delay. For example, if the data between a producer and a consumer is required to be transmitted every 300 ps, and the conductor between them is capable of transmitting the data in a faster, 100 ps timescale, then the 200 ps of slack time in which the conductor is idle is a form of inefficiency or wasted bandwidth. These two forms of wire underutilization, e.g., inefficient wire use and slack-based inefficiency, can occur separately or together, leading to inefficient use of resources, and wasting valuable wiring, power, and programmable multiplexing resources.

In many cases, the high-level description of the logic implemented on a PLD may already imply sharing of resources, such as sharing access to an external memory or a high-speed transceiver. To do this, it is common to synthesize higher-level structures representing busses onto PLDs. In one example, a software tool may generate an industry-defined bus as Register-Transfer-Level (RTL)/Verilog logic, which is then synthesized into an FPGA device. In this case, however, that shared bus structure is still implemented in the manner discussed above, meaning that it is actually converted into point-to-point static routing. Even in a scheme involving time-multiplexing of FPGA wires, such as the one proposed on pages 22-28 of Trimberger et. al. "A Time Multiplexed FPGA", Int'l Symposium on FPGAs, 1997, routing is still limited to an individual-wire basis and does not offer grouping capabilities.

SUMMARY OF THE DISCLOSURE

This disclosure relates to integrated circuit devices, and, particularly, to such devices having a programmable fabric and a communication network integrated with the programmable fabric for high-speed data passing.

In some aspects, a programmable integrated circuit includes a plurality of Network-On-Chip (NoC) stations, each NoC station in the plurality of NoC stations configured to receive a clock input and having a hard-IP interface. The hard-IP interface includes a bidirectional connection to a local logic area of the programmable integrated circuit, and a plurality of bidirectional connections to a respective plurality of neighbor NoC stations of the programmable integrated circuit.

In some aspects, a method is provided for configuring a user-programmable soft-IP interface for a NoC station of an integrated circuit, the soft-IP interface supporting a hard-IP interface of the NoC station. The soft-IP interface is instantiated, via a software library function. At least one Quality-of-Service (QoS) parameter of the NoC station is specified for the soft-IP interface via software. The soft-IP interface is configured based on the at least one QoS parameter to provide functionality for the NoC station not otherwise provided by the hard-IP interface.

In some aspects, an integrated circuit includes a plurality of NoC stations, each NoC station in the plurality of NoC stations including clock circuitry configured to receive a clock input; and a user-programmable soft-IP interface for configuring logic supporting the hard-IP interface. The user-programmable soft-IP interface includes QoS circuitry configured to manage at least one QoS-related metric for data traversing at least one connection of the NoC station.

In some aspects, a programmable logic device (PLD) includes a plurality of NOC stations, each NOC station configured to receive a clock input and comprising a hard-IP interface and a user-programmable soft-IP interface for configuring logic supporting the hard-IP interface. The hard-IP interface includes a bidirectional connection to a local logic area of the PLD and a plurality of bidirectional connections to a respective plurality of neighbor NOC stations of the programmable logic device. The user-programmable soft-IP interface includes QoS circuitry configured to manage at least one QoS-related metric for data traversing at least one connection of the NOC station.

In some aspects, A NoC interface includes bus-oriented hard-IP interface circuitry configured to provide data transfer on a standardized connection; bus-oriented soft-IP interface circuitry configured to receive data from the hard-IP interface circuitry on the standardized connection and provide additional data management functionality not provided for by the hard-IP interface, where the soft-IP interface is user customizable; and bus circuitry configured to transfer data between the soft-IP interface circuitry and a bus-oriented external logic block.

BRIEF DESCRIPTION OF THE DRAWINGS

Further features of the disclosed techniques, their nature and various advantages, will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
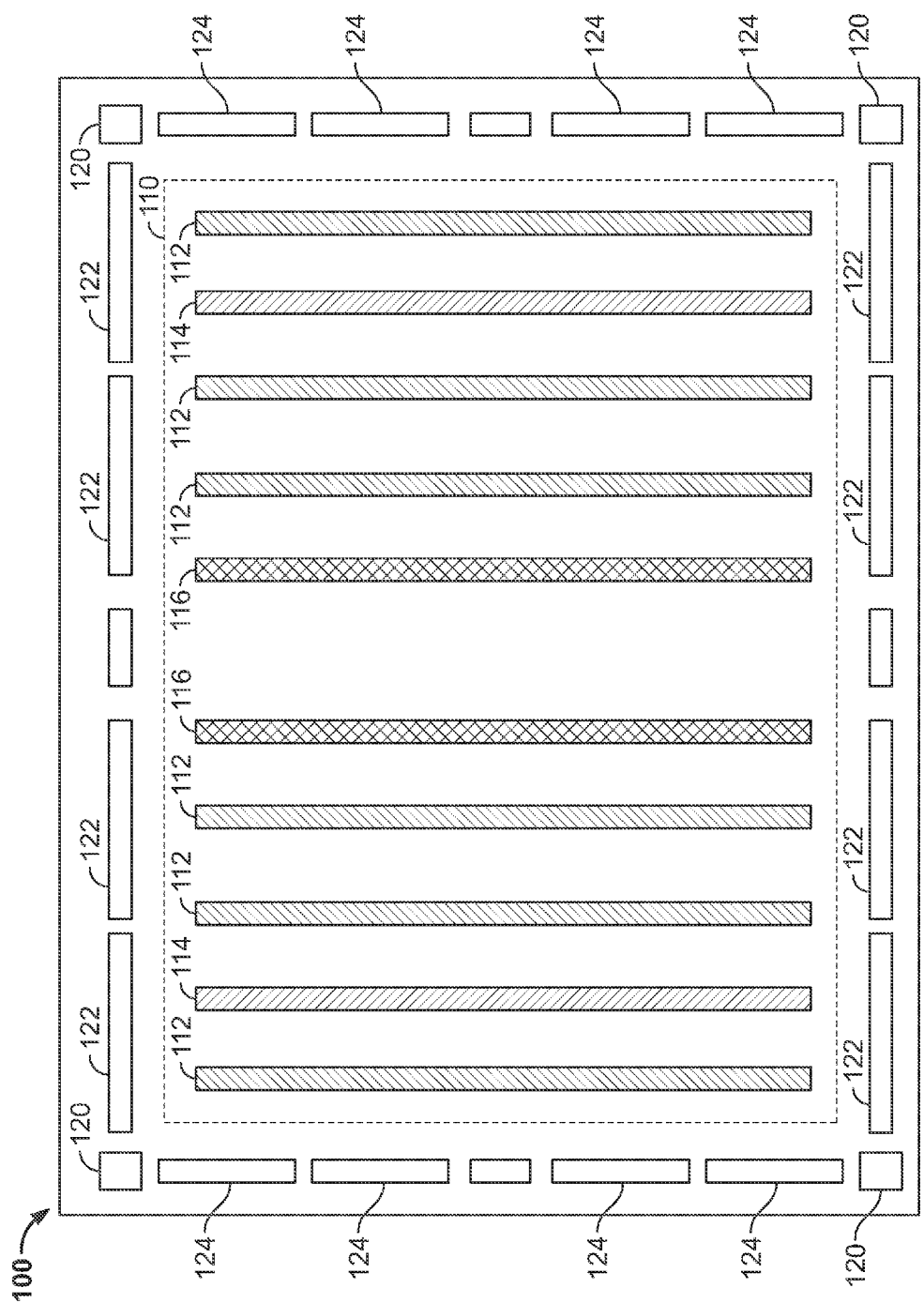
FIG. 1 depicts an illustrative floorplan of an FPGA in accordance with an implementation.

FIG. 1 depicts an illustrative floorplan 100 of an FPGA in accordance with an implementation. The floorplan 100 depicts various illustrative blocks of an FPGA. The floorplan 100 includes core logic fabric 110, which may have configurable logic blocks, look-up tables (LUTs), and/or D flip-flops (DFFs) (not explicitly shown in FIG. 1). The floorplan 100 includes memory blocks 112 and memory block 116. The memory blocks 112 may each be of a different bit size than the memory blocks 116. For example, in one arrangement, each of the memory blocks 112 is a 512-bit memory block, while each of the memory blocks 116 is a 4,096-bit memory block. The floorplan 100 includes variable-precision digital signal processing (DSP) blocks 114. In some arrangements, each DSP block of the DSP blocks 114 includes a number of multipliers, adders, subtractors, accumulators, and/or pipeline registers.

The floorplan 100 includes phase lock loops (PLLs) 120 and general purpose input-output (I/O) interfaces 122. The I/O interfaces 122 may be implemented in soft-IP and may interface with, e.g., external memory. The floorplan 100 includes hard-IP input-output (I/O) interfaces 124. The hard-IP I/O interfaces 124 may include one or more physical coding sublayer (PCS) interfaces. For example, the hard-IP I/O interfaces 124 may include 10 G Ethernet interfaces. Not shown in the floorplan 100, but implied in the core logic fabric 110, is a network of routing wires and programmable switches. The network may be configured by SRAM bits, though other means are also possible, to implement routing connections between blocks of the floorplan 100.

It is common in an FPGA and other programmable logic devices to implement bandwidth resources as multiple paths in the style of the point-to-point routing schemes discussed above. But such implementations can lead to inefficiency, e.g., because of underutilization of wires. To address this, some embodiments discussed herein increase efficiency by implementing a network which more efficiently uses the wiring and programmable multiplexing resources, for example, by sharing such resources with a common transmission wire and multiple accesses onto that wire.

Presented next are a series of alternative network on a chip (NoC) routing structures, each of which may be implemented in addition to the existing static routing resources on an FPGA. The disclosed NoC routing structures allow expensive connections in a floorplan (such as floorplan 100 of FIG. 1) to utilize shared routing resources and, thus, more efficiently make use of metal and silicon resources in an FPGA (or other programmable devices). Conceptually, some of the disclosed NoC routing structures can be thought of as lying over an existing FPGA routing fabric similar to a "highway" for carrying data throughout the FPGA.

Figure 2:
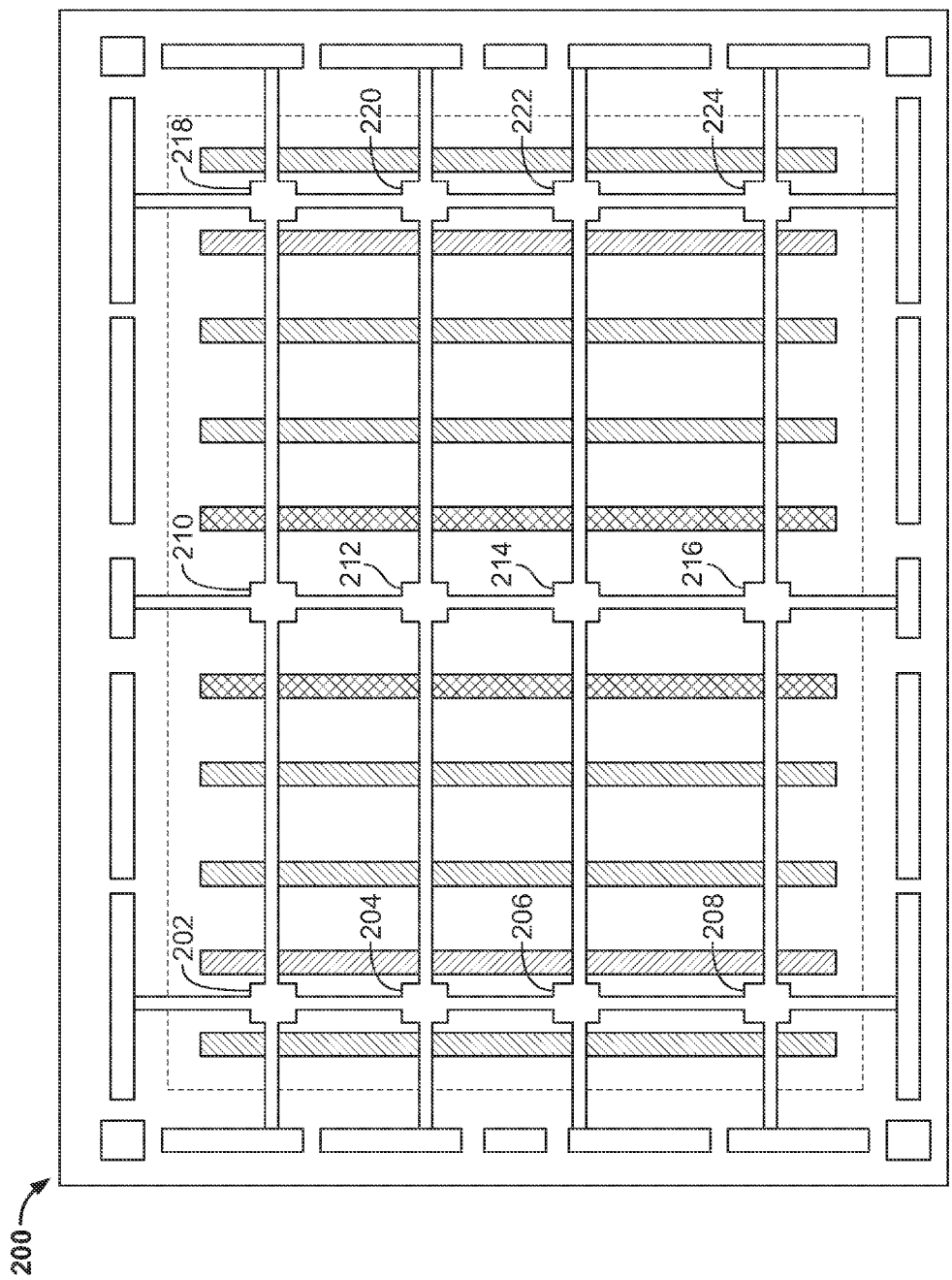
FIG. 2 depicts an illustrative mesh-based NoC routing structure for an FPGA in accordance with an implementation.

For example, FIG. 2 depicts an illustrative mesh-based NoC routing structure for an FPGA in accordance with an implementation. Floorplan 200 is identical to the floorplan 100, but includes NoC stations 202, 204, 206, 208, 210, 212, 214, 216, 218, 220, 222, and 224, and wires interconnecting those NoC stations. Each of these wires is a bidirectional wire. The floorplan 200 illustrates a case of twelve NoC stations. Each of these NoC stations may be a source point and destination point in the NoC interconnect or a landing point for a data transfer. The wires connecting the NoC stations may be preferentially multi-bit connections. For example, in one implementation, each wire of the NoC interconnect is 64-bits wide. In another implementation, each wire of the NoC interconnect is 71-bits wide, with 7 bits dedicated to out-of-band control signals.

The logic separation of the NoC interconnect (including the NoC stations and their wires) from the traditional fabric of the floorplan 200, as depicted in FIG. 2, may allow for electrical optimization particular to the characteristics and use model of the NoC interconnect. For example, a type of bussed wires, pipeline, a width, and/or spacing of NoC stations may be optimized. Further, as would be understood by one of ordinary skill, based on the disclosure and teachings herein, each of the NoC stations depicted in FIG. 2 may alternatively be represented as a general I/O pad or as an on/off direct connection.

The mesh-based NoC structure illustrated in FIG. 2 is merely one topology in which NoC stations may be implemented on an a structure such as an FPGA floorplan; other topologies may be used. Various aspects of the topology may be modified without departing from the scope of this disclosure, such as, but not limited to, directionality aspects of the topology, symmetry aspects, and other configurations aspects including time-sharing, multicast/broadcast, and/or any other aspect. Examples of these topologies are illustrated in FIGS. 3-8 below.

Figure 3:
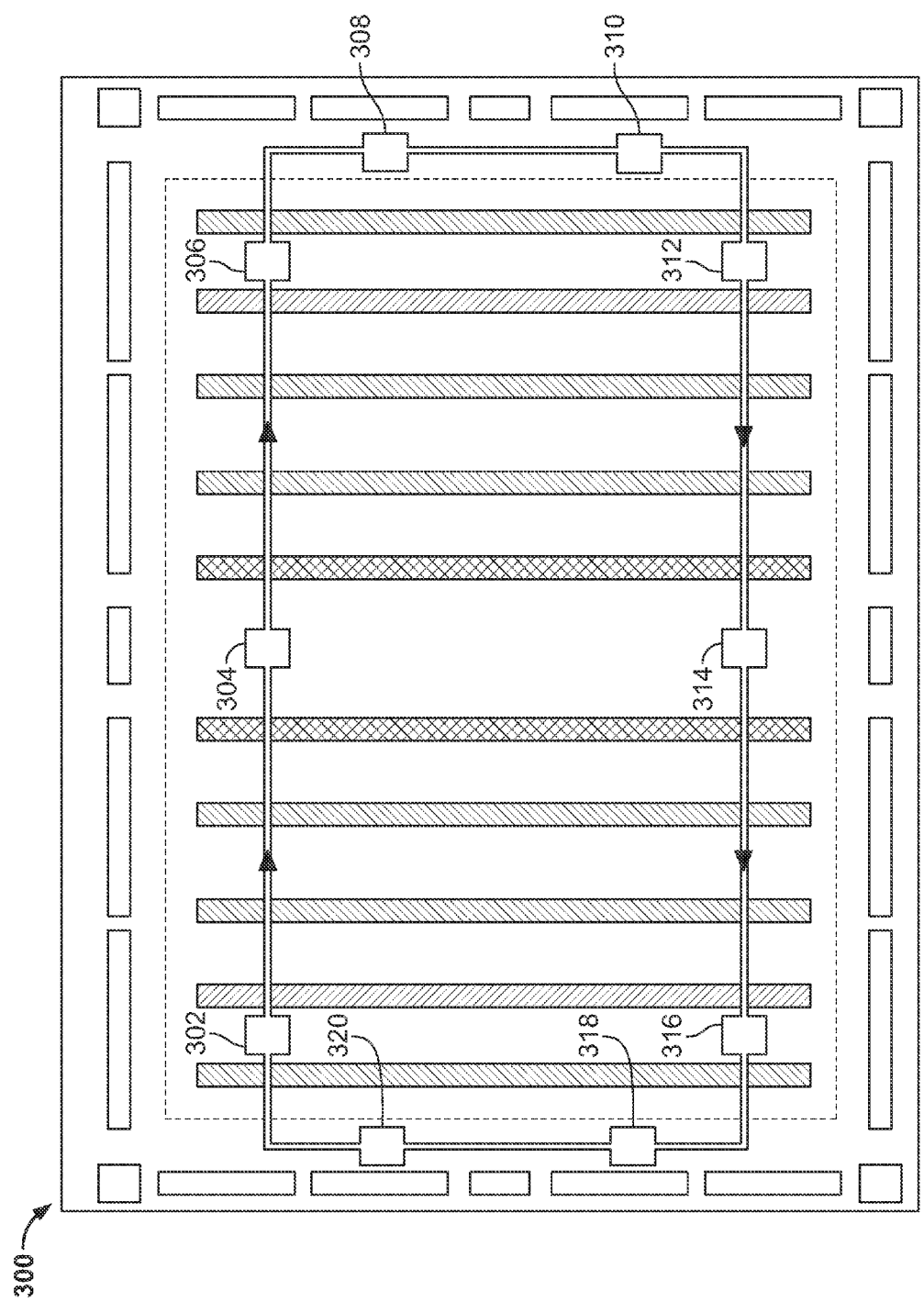
FIG. 3 depicts an illustrative unidirectional ring-based NoC routing structure for an FPGA in accordance with an implementation.

FIG. 3 depicts an illustrative unidirectional ring-based NoC routing structure for an FPGA in accordance with an implementation. Floorplan 300 is identical to the floorplan 100, but includes NoC stations 302, 304, 306, 308, 310, 312, 314, 316, 318, and 320, and wires interconnecting those NoC stations. Further, data traverses from one NoC station to another in a unidirectional, clockwise manner as indicated by the arrows in FIG. 3.

Figure 4:
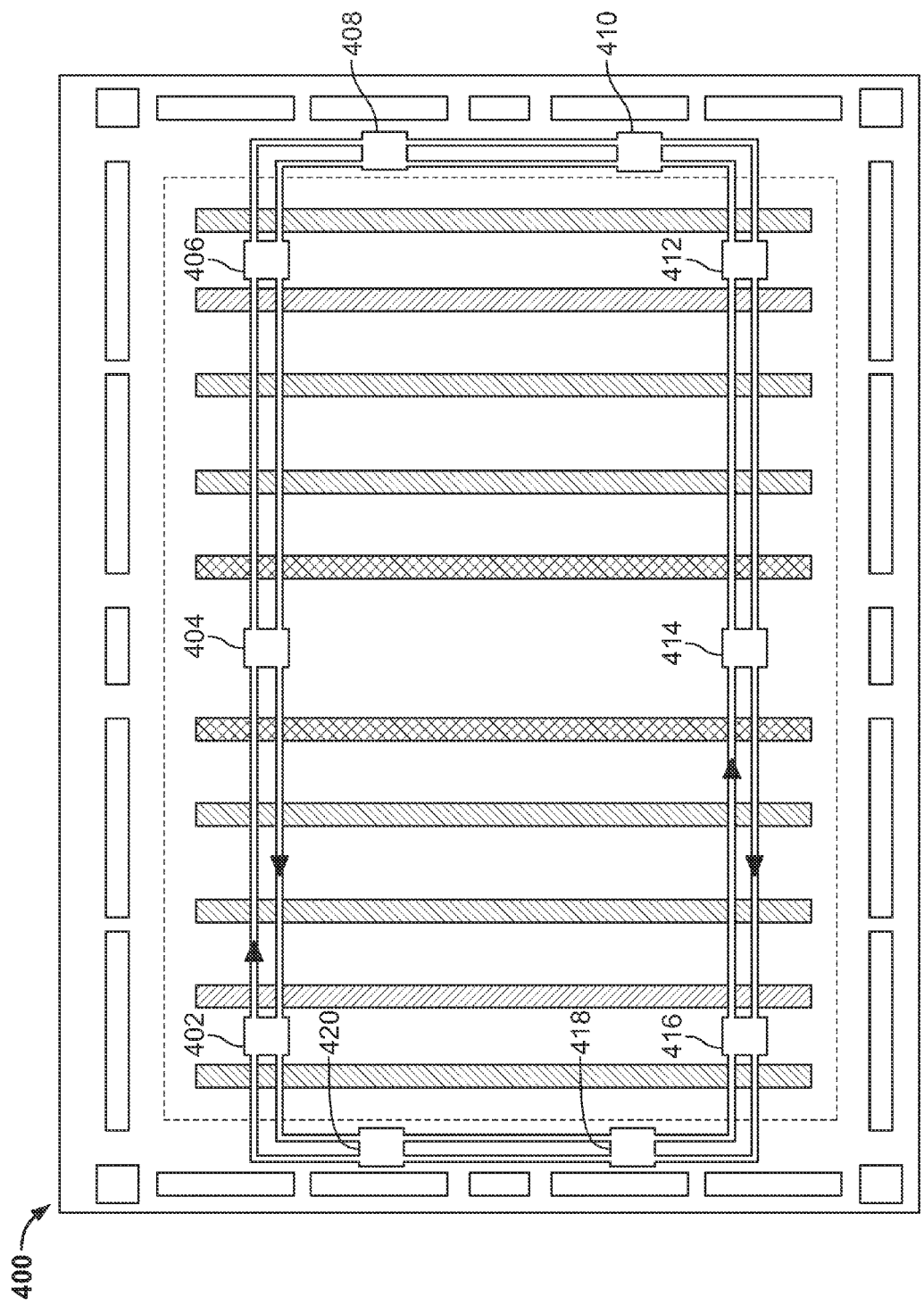
FIG. 4 depicts an illustrative bidirectional ring-based NoC routing structure for an FPGA in accordance with an implementation.

FIG. 4 depicts an illustrative bidirectional ring-based NoC routing structure for an FPGA in accordance with an implementation. Floorplan 400 is identical to the floorplan 100, but includes NoC stations 402, 404, 406, 408, 410, 412, 414, 416, 418, and 420, and wires interconnecting those NoC stations. Further, data may traverse from one NoC station to another in either a clockwise or counterclockwise manner as indicated by the directional arrows in FIG. 4.

Figure 5:
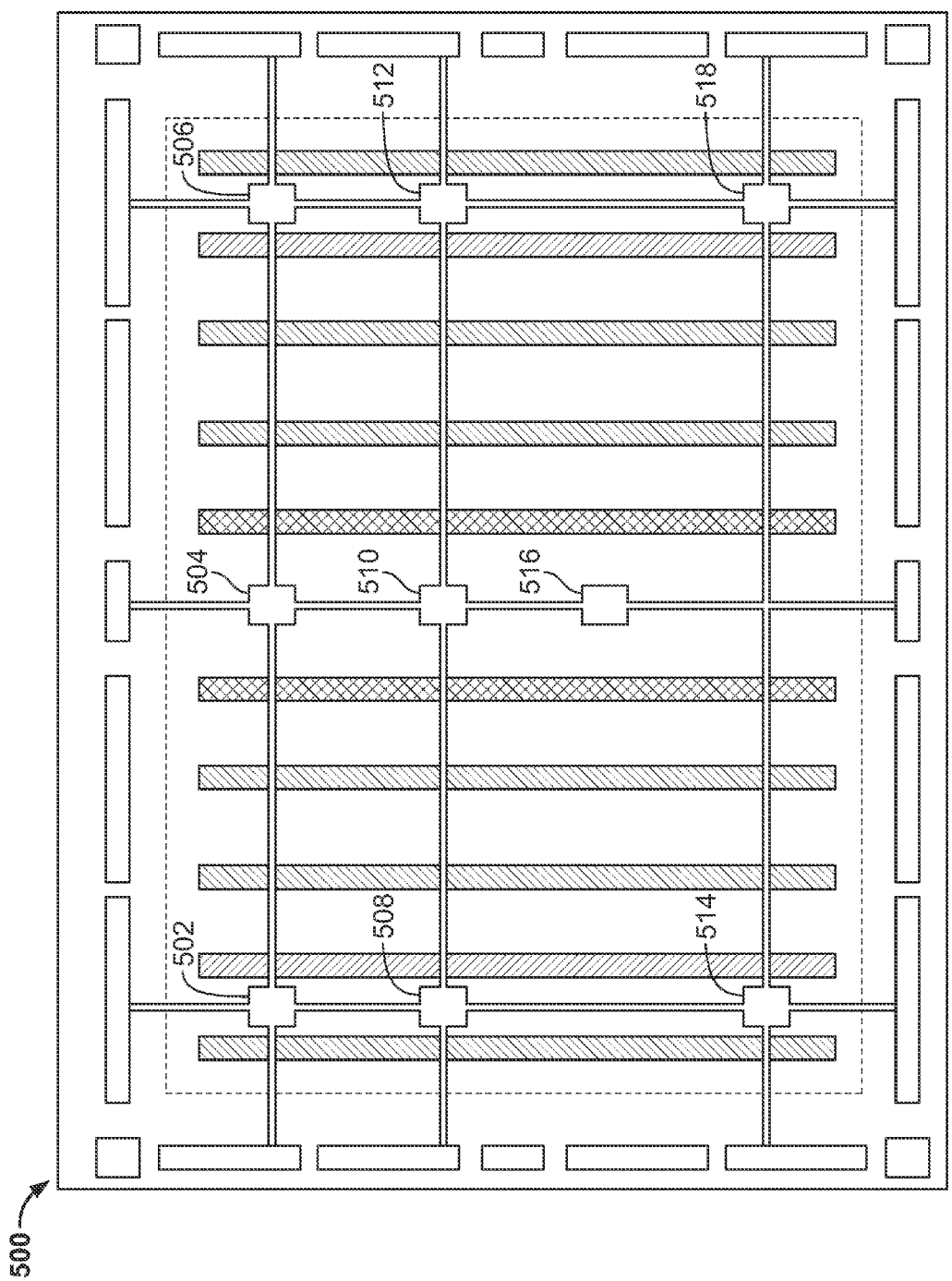
FIG. 5 depicts an illustrative asymmetric NoC routing structure for an FPGA in accordance with an implementation.

FIG. 5 depicts an illustrative asymmetric NoC routing structure for an FPGA in accordance with an implementation. Floorplan 500 is identical to the floorplan 100, but includes NoC stations 502, 504, 506, 508, 510, 512, 514, 516, and 518, and wires interconnecting those NoC stations. As depicted in FIG. 5, the topology of NoC stations is vertically asymmetric and, in particular, NoC station 516 is associated with only two wires (rather than a 4-way cross point of wired connections such as the one associated with NoC stations 502, 504, 506, 508, 510, 512, 514, and 518).

Figure 6:
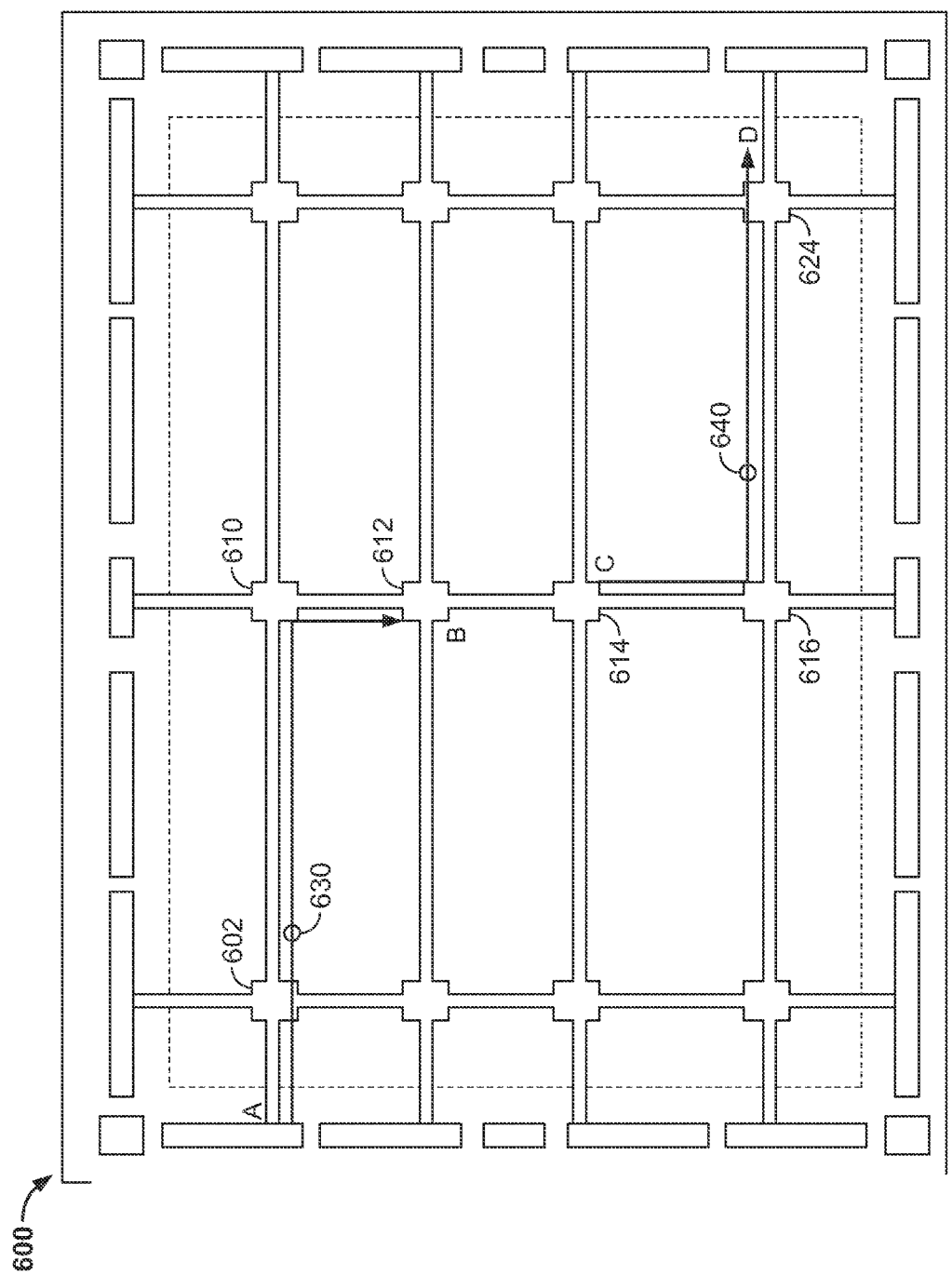
FIG. 6 depicts an illustrative static NoC routing structure for an FPGA in accordance with an implementation.

In certain implementations, data transferred on the network is statically configured so that each NoC station receives data from at most one other NoC station and outputs data to at most one other NoC station. An advantage of this technique is that each NoC station may operate according to a common clock without creating bottleneck throughput delays in the NoC topology. For example, FIG. 6 depicts an illustrative static NoC routing structure for an FPGA in accordance with an implementation. Floorplan 600 is identical to the floorplan 100 (certain elements of the core logic fabric are omitted for the purposes of illustration in FIG. 6), but includes NoC stations 602, 610, 612, 614, 616, and 624, and wires interconnecting those NoC stations.

As depicted by wire path 630 of FIG. 6, the NOC station 610 receives data from the NoC station 602 (and from no other NoC station) and provides data to the NoC station 612 (and to no other NoC station). Similarly, as depicted by wire path 640 of FIG. 6, the NOC station 616 receives data from the NoC station 614 (and from no other NoC station) and provides data to the NoC station 624 (and to no other NoC station). In some implementations, the network is pipelined and the wires of the NoC topology of the network are clocked at a higher rate than fabric stitched connections of the network. For example, with reference to FIG. 6, the fabric stitched connections of the network may operate at a clock of 400 MHZ, while each of the NoC stations (i.e., including NoC stations 602, 610, 612, 614, 616, and 624) operates at a clock of 1 GHz. Thus, in the case that each wire connecting NoC stations is 64-bit wide, a total throughput of 64 GHz would be possible.

Figure 7:
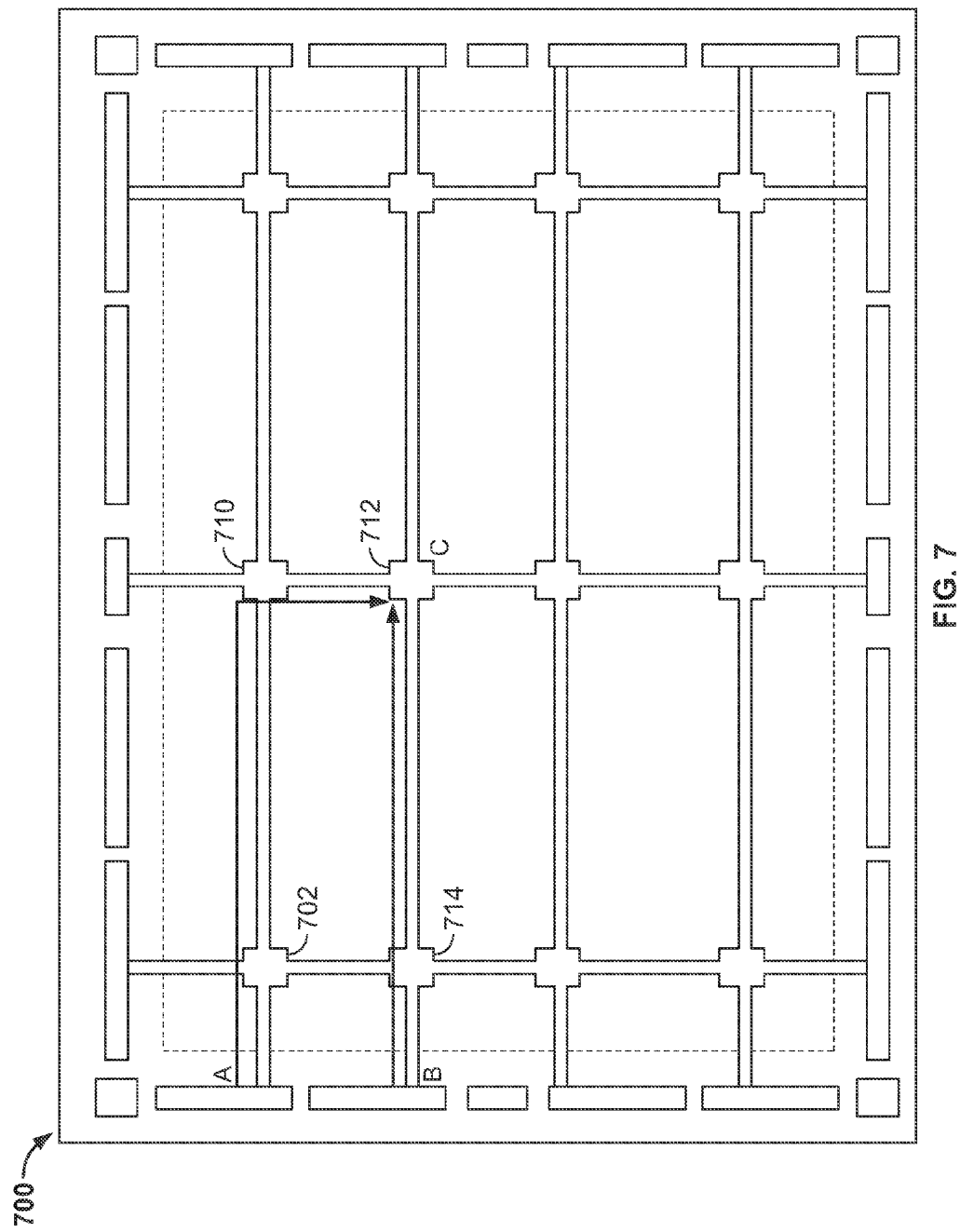
FIG. 7 depicts an illustrative time-shared NoC routing structure for an FPGA in accordance with an implementation.

In certain implementations, NoC stations of the network are arranged to operate in a shared manner, e.g., in a time-shared (or time-multiplexed) manner, a frequency-shared manner, or any suitable manner. For example, FIG. 7 depicts an illustrative time-shared NoC routing structure for an FPGA in accordance with an implementation. In FIG. 7, NoC stations 702 and 714 each forward data to NoC station 712. The NoC station 712 collects the aggregate data provided by the NoC stations 702 and 714 using any suitable time-shared scheme. For example, the NoC station 712 may collect data using a round-robin scheme in which data is collected from a buffer of NoC station 710 for a first time interval, from a buffer of NoC station 714 during a second time interval, and then the round-robin scheme repeats. Further, the NoC station 712 could transfer this aggregated data into a local memory buffer or some other appropriate capture mechanism. The logic circuitry supporting the NoC station 712 may contain configuration data specifying the appropriate clock for the station and/or a time-shared/time-sliced mechanism for accepting data from the two sources (e.g., NoC stations 702 and 714).

Figure 8:
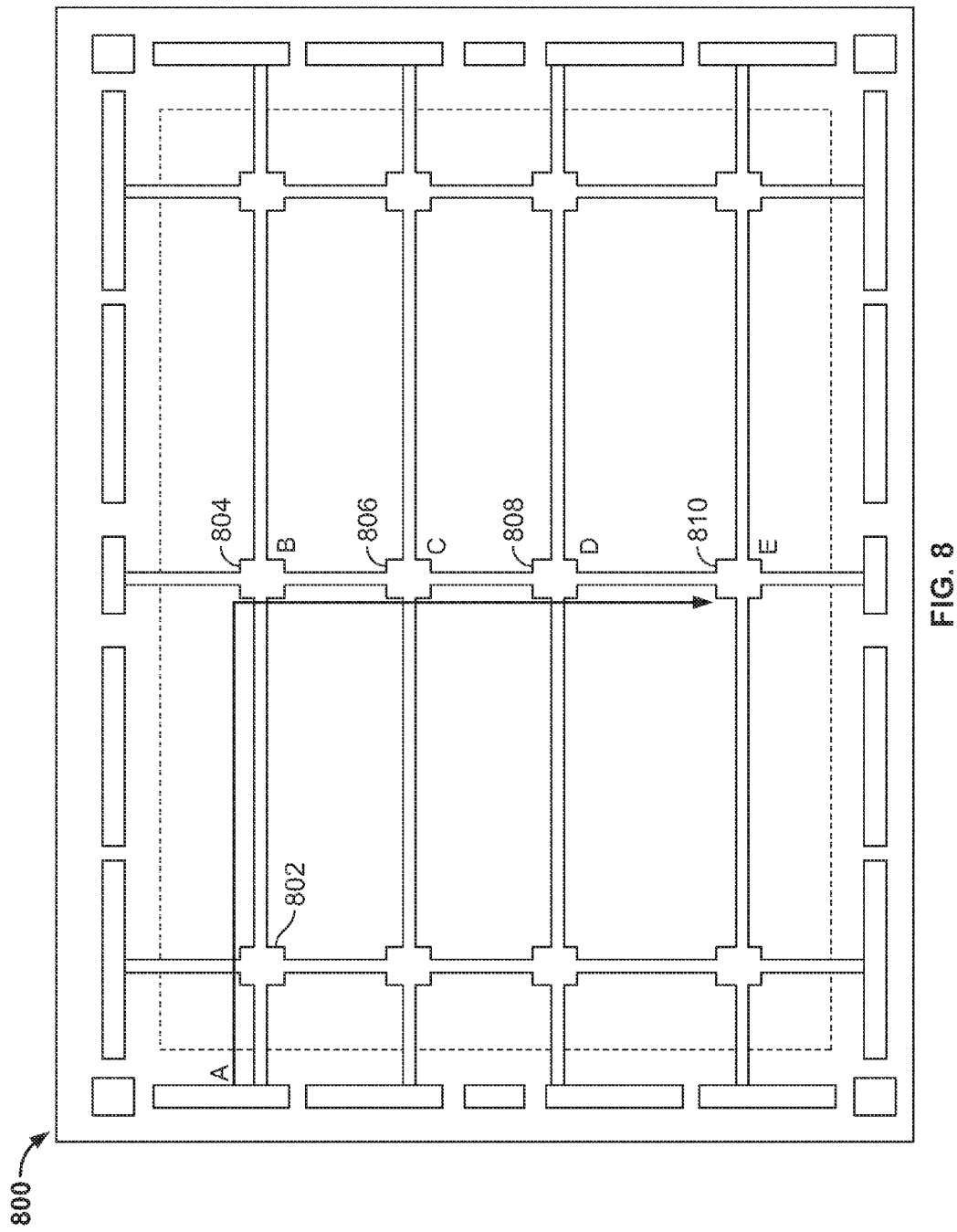
FIG. 8 depicts an illustrative NoC routing structure based on data tags for an FPGA in accordance with an implementation.

In some implementations, data is appended with tags identifying whether the data is to be consumed, observed, and/or processed by a given NoC station. For example, FIG. 8 depicts an illustrative NoC routing structure based on data tags for an FPGA in accordance with an implementation. Floorplan 800 is identical to the floorplan 100, but includes NoC stations 802, 804, 806, 808, and 810, and wires interconnecting those NoC stations. In one implementation, data is generated at a location A of core logic fabric 830 and destined for a location B of the core logic fabric 830. This data traverses NoC stations 802, 804, 806, 808, and 810. In particular, a packet of data generated at A may be appended with information identifying NoC station 810 as an intended destination NoC station.

The packet would then be forwarded from the NoC station 802 to the NoC station 810 according to any specified protocol (e.g., a broadcast or multicast protocol). For example, according to an illustrative broadcast protocol, the packet may be transferred across NoC stations in the following sequence: NoC station 802, NoC station 804, NoC station 806, NoC station 808, and NoC station 810. Each of these stations inspects the packet to see if the station is specified as the intended destination in the appended information of the packet.

In the present example, only NoC station 810 is specified as the intended destination of the packet. Thus, each of NoC stations 804, 806, and 808 receives the packet, determines not to process the packet, and forwards the packet onto a next NoC station. The next NoC station may be determined locally or globally based on a broadcast scheme or in any suitable manner. The NoC station 810 eventually receives the packet, determines that it is specified to process the packet, and, based on that determination, transfers the packet into the local logic area of the point B. Thus, this technique represents a model of computation in which streaming data is appended with tags indicating the NoC stations which are to process the data (i.e., transfer the data into a local logic area or perform some operation on the data other than simply forwarding it to another NoC station). Each NoC station, upon receiving data, determines whether it is specified to process the data. If so, the NoC station processes the data. Otherwise, the NoC station simply forwards the data without processing it.

Figure 9:
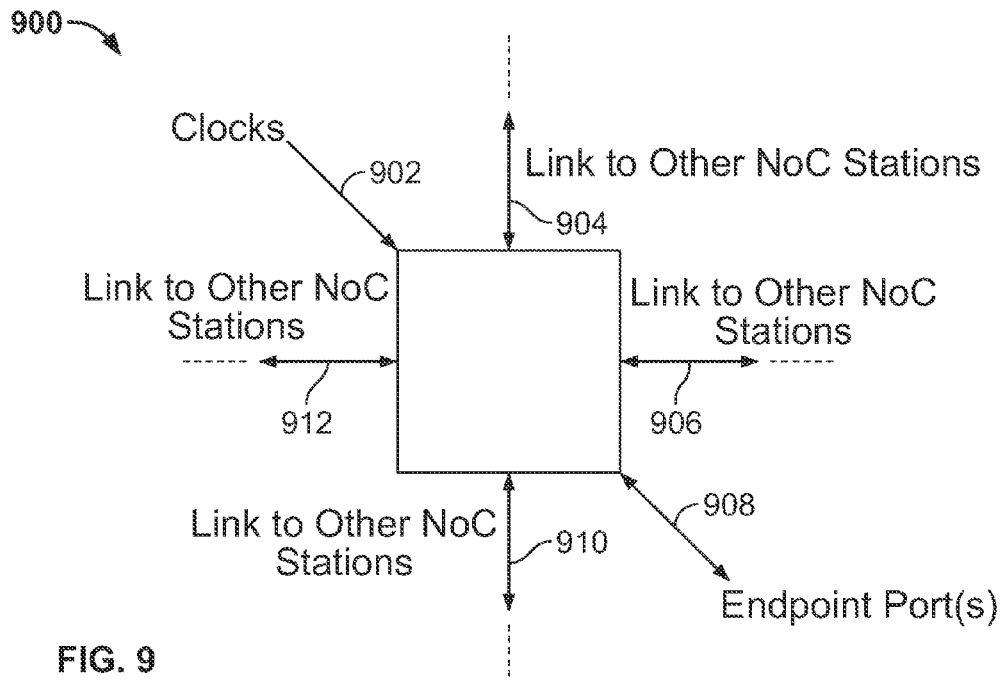
FIG. 9 depicts a schematic diagram of functionality associated with a NoC station in accordance with an implementation.

FIG. 9 depicts a schematic diagram of functionality associated with a NoC station 900 in accordance with an implementation. In one embodiment, the NoC station 900 accepts clocking from global clock signals 902, has bidirectional links to each of the north, south, east and west neighbors via links 904, 910, 906, and 912, respectively, and has a bidirectional link 908 to the local FPGA logic fabric. In the illustrated example of FIG. 9, the bidirectional link 908 is coupled to endpoint ports, which may correspond to where data enters the NoC topology from the local logic fabric and/or leaves the NoC topology for the local logic fabric.

The functionality associated with FIG. 9 may apply for different configuration of the NoC station, for example, whether the NoC station is statically switched or implements dynamic packet routing. The use of four bidirectional links (i.e., north, south, east, and west) to other NoC stations is exemplary. For example, some (or all) of the NoC stations in a given topology may use unidirectional links of a same or different bit width or arrangement than the bidirectional links present in the network. Further, some (or all) of the NoC stations in a given topology may include fewer or more than one link to the local FPGA logic fabric. For example, zero links to the local FPGA fabric implies that the station acts only as a router but not a source or destination point, and more than one link implies that more than one stream of data could enter the NoC station. These multiple streams could be arbitrated and/or otherwise multiplexed onto the network.

Further, some (or all) of the NoC stations in a given topology may omit horizontal links 906 and 912 to other NoC stations, thus providing vertical-only routing. Similarly, some (or all) of the NoC stations in a given topology may omit vertical links 904 and 910 to other NoC stations, thus providing horizontal-only routing. Other topologies are also possible.

In some embodiments, for example, in the case where the data is packet-routed, the NoC station 900 is configured to access additional configuration information (not shown in FIG. 9). For example, the NoC station 900 may be configured to access an address of the NoC station/block, to use selectors to choose from one or more clock resources, and/or to handle Quality-of-Service (QoS) requirements. The NoC station is optionally provided, in some embodiments, with resources such as buffering memories to store some packets such as when the network is busy.

The QoS requirements may relate to any suitable performance parameter, such as, but not limited to, a required bit rate, latency, delay, jitter, packet dropping probability, data disposability, the priority and importance of a packet to be transmitted, and/or bit error rate. The QoS requirements may include any information related to the quality or performance of data communication in the FPGA or the NoC, such as a buffer size of a memory of the NoC station, a data width of the NoC station, and/or a store-and-forward policy of the NoC station.

A NoC station such as NoC station 900 of FIG. 9 may include a hard-IP portion and a soft-IP configurable portion. Thus, in order to configure a NoC, a mechanism may be provided for a designer to configure the soft-IP portion of each of multiple NoC stations or nodes. The mechanism may include a computer-aided design (CAD) tool. The configuration of the soft-IP portion of the NoC station may be specified according to a "MegaFunction" or library function which allows instantiation of the NoC station. A MegaFunction refers to one or more of a (1) user interface, (2) software, and (3) supporting implementation, to describe an ability for a user of a device to use one or more functionalities of the device in a flexible, parameterized way. The supporting MegaFunction implementation may include supporting soft logic and/or hard logic. The intervening MegaFunction software may determine how to implement the parameters supplied by the user, while running the MegaFunction user interface. For example, the MegaFunction software may determine how the user-supplied parameters get translated to changes in the soft logic, and/or to settings in the hard logic. In some embodiments, the MegaFunction implementation logic is generated by a graphical user interface, variously referred to as "wizard", "plug-in", "Mega-Wizard Plug-In Manager" or similar terminology.

Figure 10:
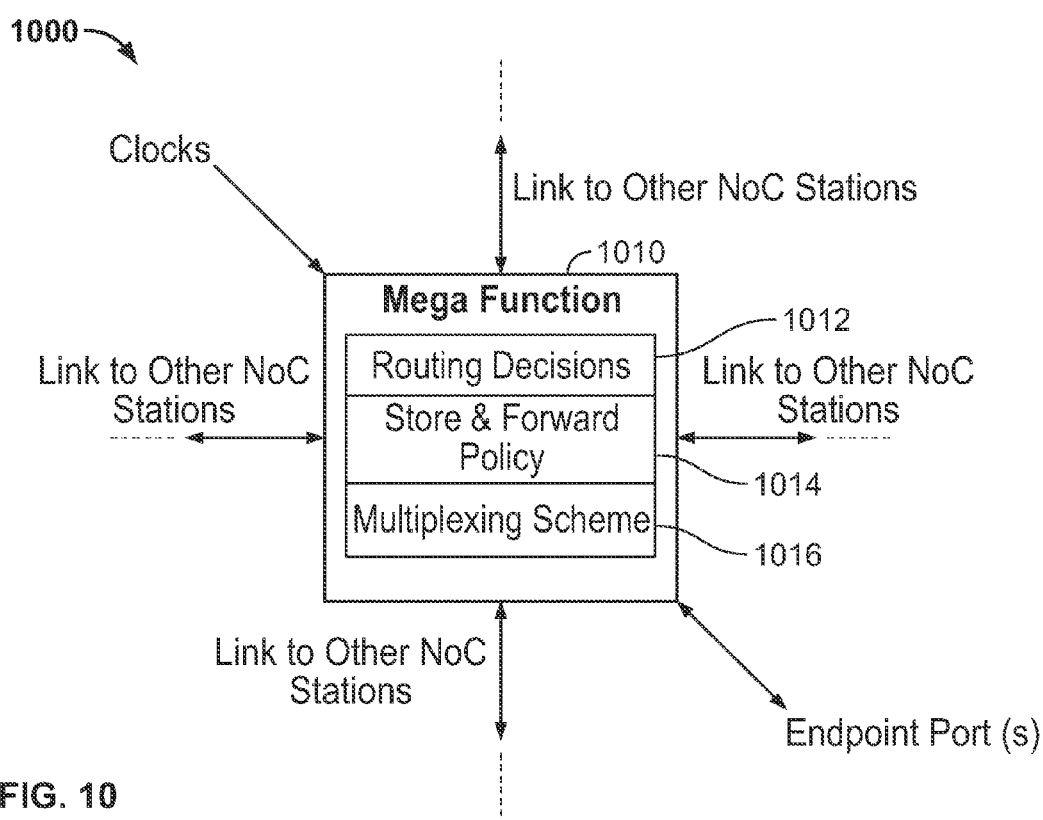
FIG. 10 illustrates a MegaFunction for implementing a NoC station with parameterizable network operation according to an implementation.

According to some aspects, the MegaFunction allows parameterizability on the operation of the network. FIG. 10 illustrates a MegaFunction 1010 for implementing a NoC station 1000 with parameterizable network operation according to an implementation. As depicted by illustrative MegaFunction 1010, the MegaFunction can configure various aspects of the internal operation of the network, for example, by specifying static routes or other routing decision (at 1012), setting a store-and-forward policy (at 1014), specifying multiplexing schemes/settings (at 1016), and/or by setting any other desired operational parameters. The MegaFunction 1010 may, for example, configure aspects of the internal operation of the network by instantiating QoS flags and/or setting a buffer size of an integrated FIFO. The MegaFunction 1010 may output RTL-level logic required to interface the hardened station/node of the NoC into the fabric, e.g., by instantiating the source and destination registers in the FPGA logic, setting the timing constraints of the paths, and/or creating the required clock crossings. In one implementation, the MegaFunction 1010 may allow the NoC to operate at a fixed high-speed clock rate, while letting the FPGA fabric run at a user-determined clock rate, which can be lower than the NoC high-speed clock rate.

Figure 11:
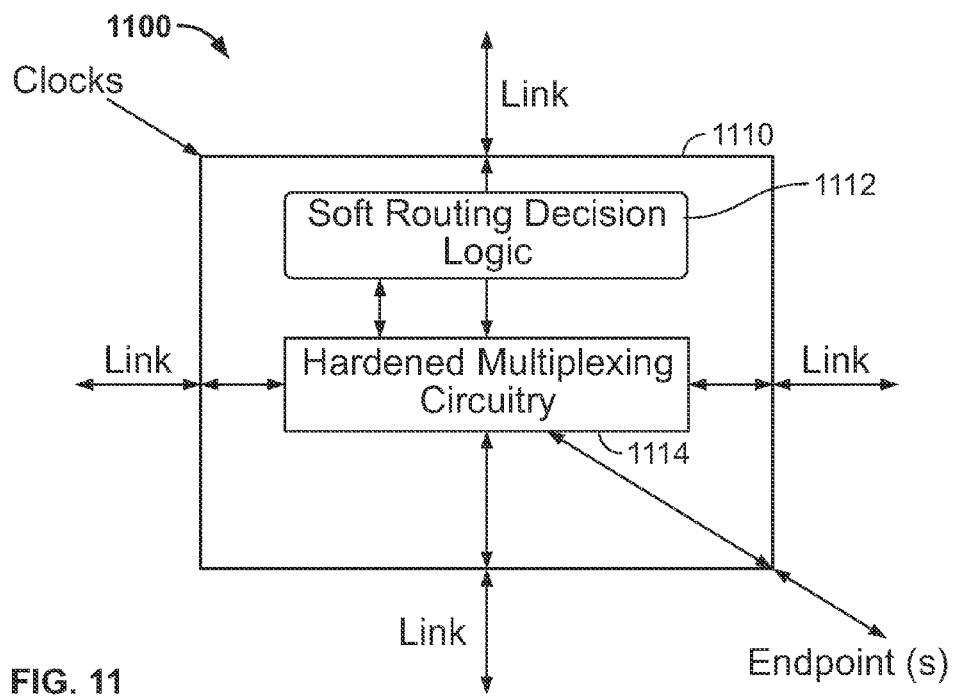
FIG. 11 illustrates a MegaFunction with such soft-logic interface functionality, implementing a NoC station according to an implementation.

According to some aspects, the MegaFunction may allow soft-IP configurability of the network. For example, the MegaFunction may provide an interface for soft logic, such as logic interfaces located near the FPGA fabric. The soft-logic interface may be used to configure decision-making that was not envisioned or embedded in the hardened implementation of the device. FIG. 11 illustrates a Mega-Function 1110 with such soft-logic interface functionality, implementing a NoC station 1100 according to an implementation. The MegaFunction 1110 includes soft routing decision logic 1112 in communication with hardened multiplexing circuitry 1114. The soft routing decision logic 1112 may be programmed with any type of functionality by the designer after hardening of the NoC station 1100 or device. The hardened multiplexing circuitry 1114 may send data in one or more direction as determined by soft routing decision logic 1112. For example, soft routing decision logic 1112 may have decided or determined that the data from the left Link is to be sent to the top Link. To accomplish this routing decision, soft routing decision logic 1112 may send multiplexor settings to hardened multiplexing circuitry 1114 to effect that connection. For example, hardened multiplexing circuitry 1114 may be configured based on the received multiplexor settings to implement a target set of connections.

Figure 16:
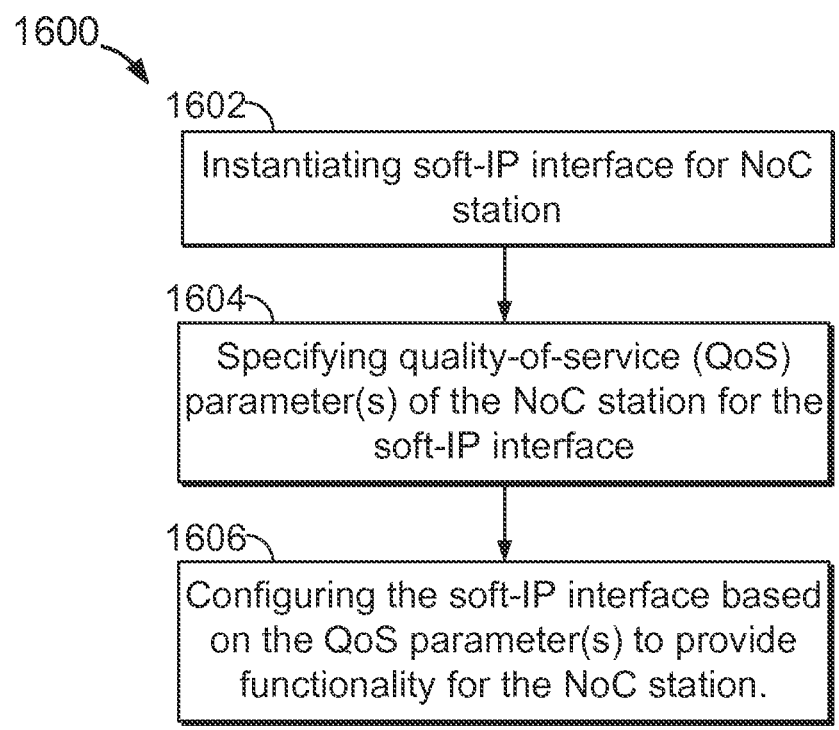
FIG. 16 is a flowchart illustrating a process for configuring a user-programmable soft-IP interface for a NoC station in accordance with some implementations.

FIG. 16 is a flowchart illustrating a process 1600 for configuring a user-programmable soft-IP interface for a Network-On-Chip (NoC) station of an integrated circuit. As a result, the soft-IP interface may support a hard-IP interface of the NoC station. Process 1600 may be implemented in a NoC station similar to any of the NoC stations described herein.

At 1602, the soft-IP interface for the NoC station is instantiated via a software library function. The software library function may be provided through a MegaFunction, e.g., such as any of the MegaFunction blocks illustrated in FIGS. 10, 11, and 12.

At 1604, at least one Quality-of-Service (QoS) parameter of the NoC station is specified via software. In one implementation, the at least one QoS parameter specifies a buffer size of a memory of the NoC station and/or a store-and-forward policy of the NoC station. The software may output RTL code for interfacing the soft-IP interface of the NoC station to the hard-IP interface of the NoC station.

At 1606, the soft-IP interface is configured based on the at least one QoS parameter from 1604 to provide functionality for the NoC station. The functionality may not otherwise be provided by the hard-IP interface.

In one implementation of 1606, the at least one QoS parameter specifies a data width of the NoC station, and the soft-IP interface provides data adjustment/adaptation functionality, such as to break data greater than the width of the NoC into multiple transactions or to pad undersized data to the datawidth of the NoC. For example, the soft-IP interface may be set up to provide segmentation of data received at the NoC station into smaller units of data for processing by the NoC station, if the data is of a width greater than a specified data width. The soft-IP interface may be set up to provide padding of the data received at the NoC station so that the padded data may be processed by the NoC station, if the data is of a width less than the specified data width.

In one implementation of 1606, the functionality provided by the soft-IP includes regulating streams of data based, at least in part, on one or more QoS constraints for each respective stream of data. The one or more QoS constraints for a given stream of data may be specified, e.g., at 1604, based on an available bandwidth parameter. The regulating may be done by multiplexing the streams of data, interleaving the streams of data, and/or any other suitable way. For example, the MegaFunction implementation can be configured to multiplex multiple transaction streams, including arbitration logic, interleaving, rate-matching and bandwidth or QoS allocation. The MegaFunction logic 1110 may in some cases be configured by adding logic for either primitive flow-control (e.g., acknowledgment ACK signals) or more complicated standard protocols such as high-speed bus interfaces.

In various implementations, the datawidth of the NoC may be set as one of multiple settings, for example, to either a data-only setting or a data-plus-metadata setting. In one illustrative example, NoC may implement a logic 48-bit bus appended with 16 bits of metadata, such as address/control flags, in a 64-bit physically-allocated datapath. A designer may generate the logic himself or herself using the configurable FPGA fabric. Alternatively or in addition, the MegaFunction may add such logic for configuring allocation of datawidth.

According to some aspects, the MegaFunction implementation may be allocated separate memory resources, such as a separate store-and-forward memory component. For example, the MegaFunction can instantiate both the NoC station and a path to a nearby embedded memory block to act as a receiver buffer for traffic burst from/to the local area over the network.

Figure 12:
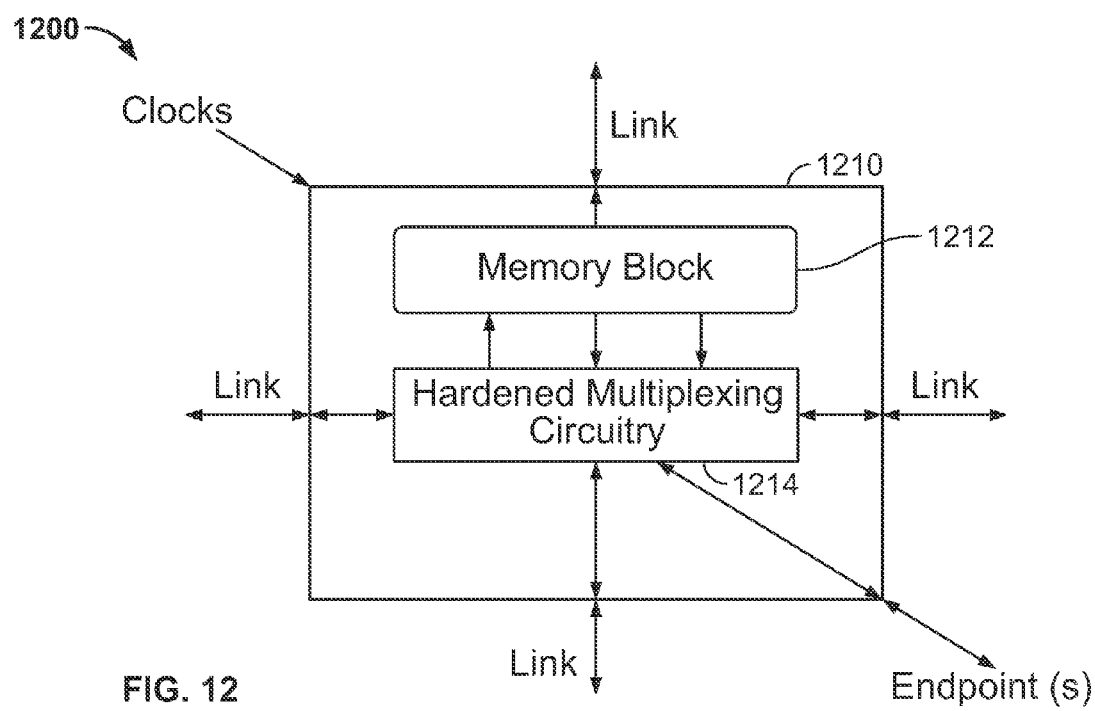
FIG. 12 depicts an illustrative MegaFunction with embedded memory resources, implementing a NoC station according to an implementation.

FIG. 12 depicts an illustrative MegaFunction 1210 with such embedded memory resources, implementing a NoC station 1200 according to an implementation. MegaFunction 1210 includes an embedded memory block 1212, which may be an FPGA fabric RAM component in some implementations.

In some implementations, the hardened multiplexing circuitry 1214 may have customizable multiplexor settings and may operate similarly to hardened multiplexing circuitry 1114 of FIG. 11. For example, the hardened multiplexing circuitry 1214 may be configured using soft routing decision logic to effect different sets of connections, e.g., depending on a user-defined design. In some embodiments, the hardened multiplexing circuitry 1214 may have fixed multiplexor settings and may implement the same set of connections without possibility of adjustment.

Memory block 1212 may implement rate-matching functionality. For example, memory block 1212 may store data that is arriving at a quicker rate than the data is exiting. Alternatively or in addition, memory block 1212 may store data when the destination is busy and/or unavailable. The rate-matching functionality may be implemented whether or not the MegaFunction implementation includes soft routing decision logic. For example, the soft routing decision logic might have decided to change the data connections, which might cause the data connections to overlap in time. In this case, for example, some of the data being routed may need to be stored in memory block 1212 during the overlap.

Some programmable devices include redundant regions with additional rows or columns of resources in a specified region which can be turned off to recover fabrication yield. In some embodiments, the pitch of NoC regions is tied to the redundancy regions. For example, a device may be constructed such that there are N physical rows of logic but where one row, denoted the redundant or spare row, is present only for repair of a failed row, leaving N-1 logical rows for use. When the device is tested, each row is tested and then one "broken" row is marked, using a programmable fuse or comparable technology, as unused. If some row fails the test, the spare row is programmed to take its place. If no row fails, then the spare row is marked as unused. In some devices, the device is additionally divided into multiple repair regions or super-rows. For example, a device may have M vertically stacked quadrants of the aforementioned N-row device. Setting exemplarily N to 33 and M to 4, this would yield a device with M*N=132 physical rows, M*N-1=128 logical rows, and for which one row in any of the M regions can be independently marked as unused. In some implementations of such devices, the boundaries of redundant regions act as a natural break to the programmable logic fabric and are therefore a natural location for blocks that cannot be tiled at the individual row and/or column level. When such boundaries exist due to redundancy or similar provision, the NoC regions may be implemented using these locations.

Figure 13:
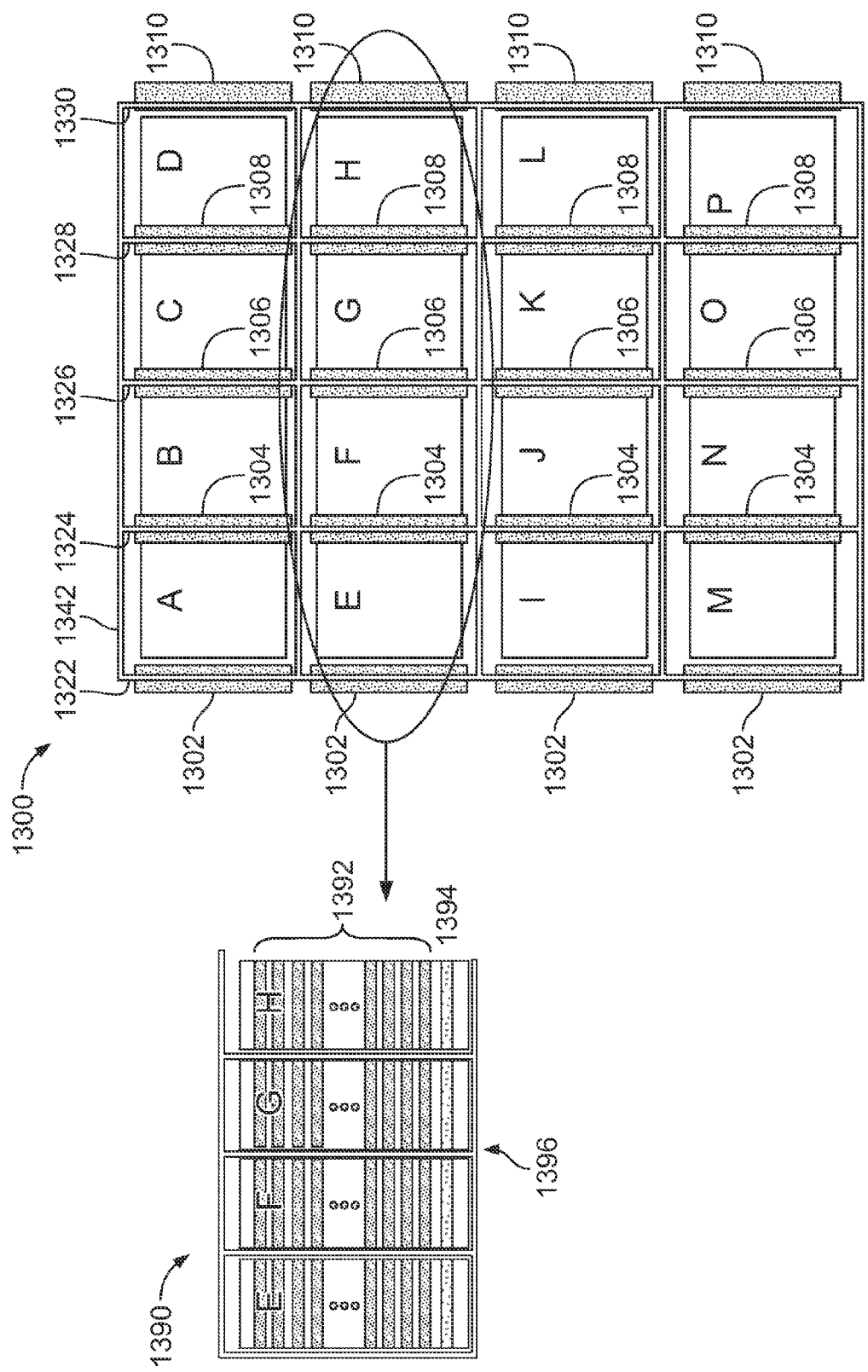
FIG. 13 illustrates a manner in which NoC stations may be placed in an FPGA device with a vertically tiled organization according to an implementation.

FIG. 13 depicts a manner in which NoC stations may be placed in an FPGA device 1300 with a vertically tiled organization according to an illustrative implementation. In the illustrative example of FIG. 13, NoC stations are placed in an FPGA device 1300 with 16 regions, labeled A through P. FPGA device 1300 has 4 super-rows {ABCD, EFGH, IJKL, MNOP}. FPGA device 1300 additionally has NoC columns 1322, 1324, 1326, 1328, and 1330, placed in between super-columns {AEIM, BFJN, LGKO, DHLP}, respectively, to physically hold the NoC. For example, NoC logic portions 1302, 1304, 1306, 1308, and 1310 of one or more NoC stations are placed along the NoC columns 1322, 1324, 1326, 1328, and 1330 of the FPGA device 1300. Zoomed view 1390 of the super-row EFGH shows the regular rows 1392 and the spare row 1394 inside this super-row EFGH, and the location 1396 of the NOC around this super-row.

The arrangement illustrated in FIG. 13 may have several advantages. First, this arrangement may eliminate the need for redundancy-steering logic as part of the NoC station and wiring. Rather, the logic is distributed according to the redundant regions. Second, this arrangement tends to provide a uniform absolute distance between NoC stations, since the redundancy regions are generally tied to raw Silicon areas due to the relationship between area and yield defects. As a result, the arrangement of FIG. 13 may allow for appropriate pipelining and constant network operating speeds across a range of device sizes.

Figure 14:
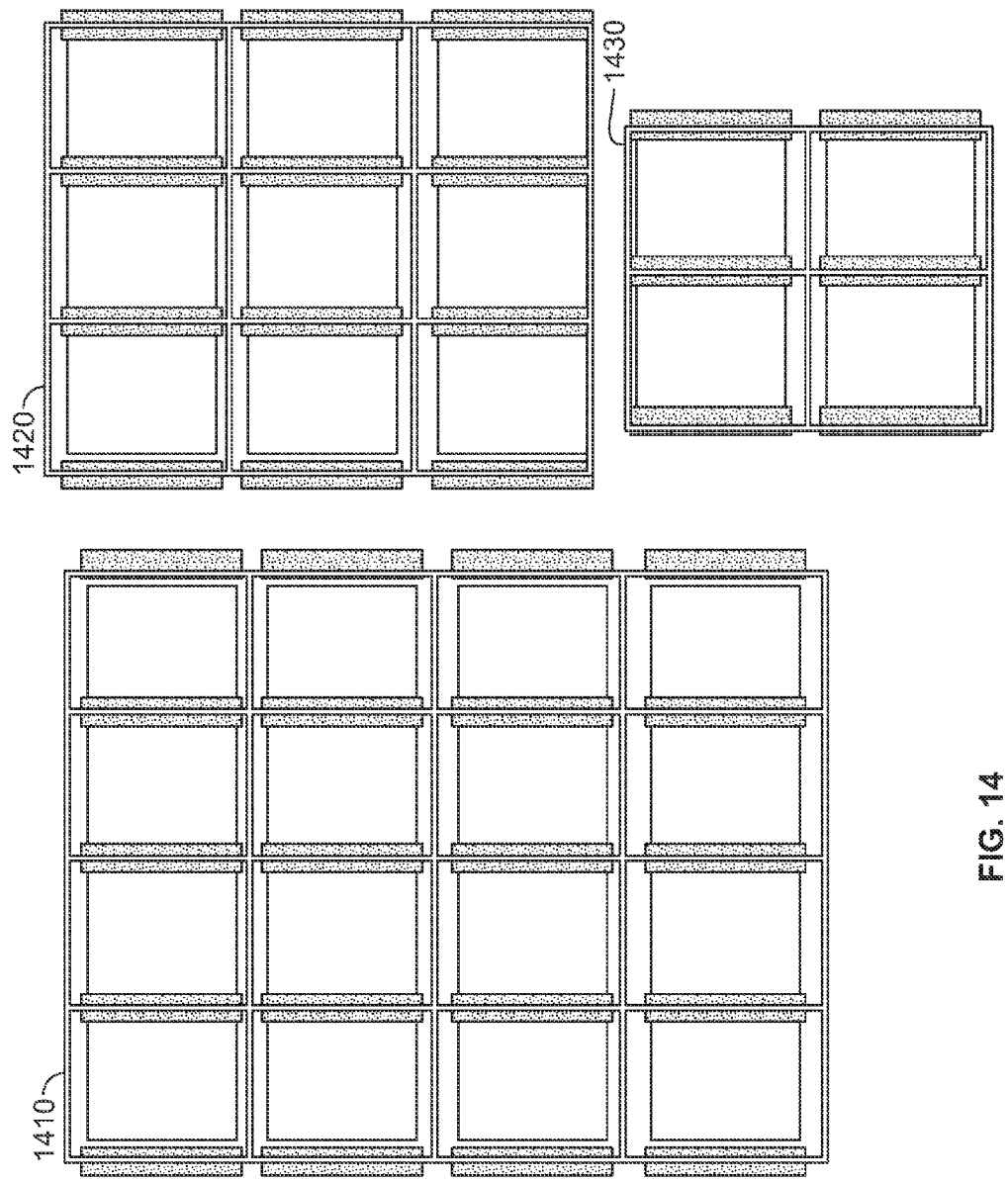
FIG. 14 depicts several illustrative family variants in which NoC components scale to different device sizes in accordance with some implementations.

For example, in a family of devices utilizing arrangements similar to that of FIG. 13, the NoC can be provisioned as to be efficiently scalable. For example, FIG. 14 depicts several family variants in which NoC components scale to different device sizes while retaining common properties of a base network in accordance with an arrangement. In particular, device 1410 includes 16 device regions, device 1420 includes nine device regions, and device 1430 includes four device regions. Each of the devices 1410, 1420, and 1430 stores logic of NoC stations in their respective vertical columns. By pipelining each of these devices, a constant network speed is achieved across family members (i.e., the devices 1410, 1420, and 1430) even though the latency in clock cycles may grow with the size of the devices 1410, 1420, and 1430. A source design embedded in such an architecture would thus be re-targetable to different device family members as long as adequate care was taken in the architecture of the source design for latency-variable communication.

To facilitate practical use of NoC technology in a programmable logic or other devices, the end-product is typically verified through simulation and other means. In one embodiment, the higher-level tools with which the NoC is instantiated may also provide auto-generated simulation models. Examples of such models include Verilog/VHDL, System Verilog or Bluespec and/or transactional-level modes in SystemC or other forms of expression.

Several benefits of fast-moving switched paths such as the ones enabled by the NoC systems and methods described herein involve connecting to external components. In some embodiments, the NoC is specifically tied to the operation of the two primary I/O systems: a memory system such as through a DDR external memory interface (EMIF), and a transceiver system such as through a high-speed serial interface (HSSI) interface or through a PCS (physical code sublayer) block which terminates a physical protocol. For programmable devices with ASIC or other embedded logic components, similar connections tying those system blocks to the NoC are also envisioned.

The NoC functionality may provide additional value to the applications implemented on a device by arbitrating for these fixed resources between different requestors. For example, if two (or more) portions of the user design involve access to a single bank of DDR memory, both can place their requests onto the hardened NoC and allow the NoC's arbitration mechanism to determine who gets access to the memory. This may lead to reduction of the user logic counts, because there is no need for the user to configure arbitration logic in this way. This may also lead to frequency improvement due to the hardened and distributed arbitration mechanism in place.

Figure 15:
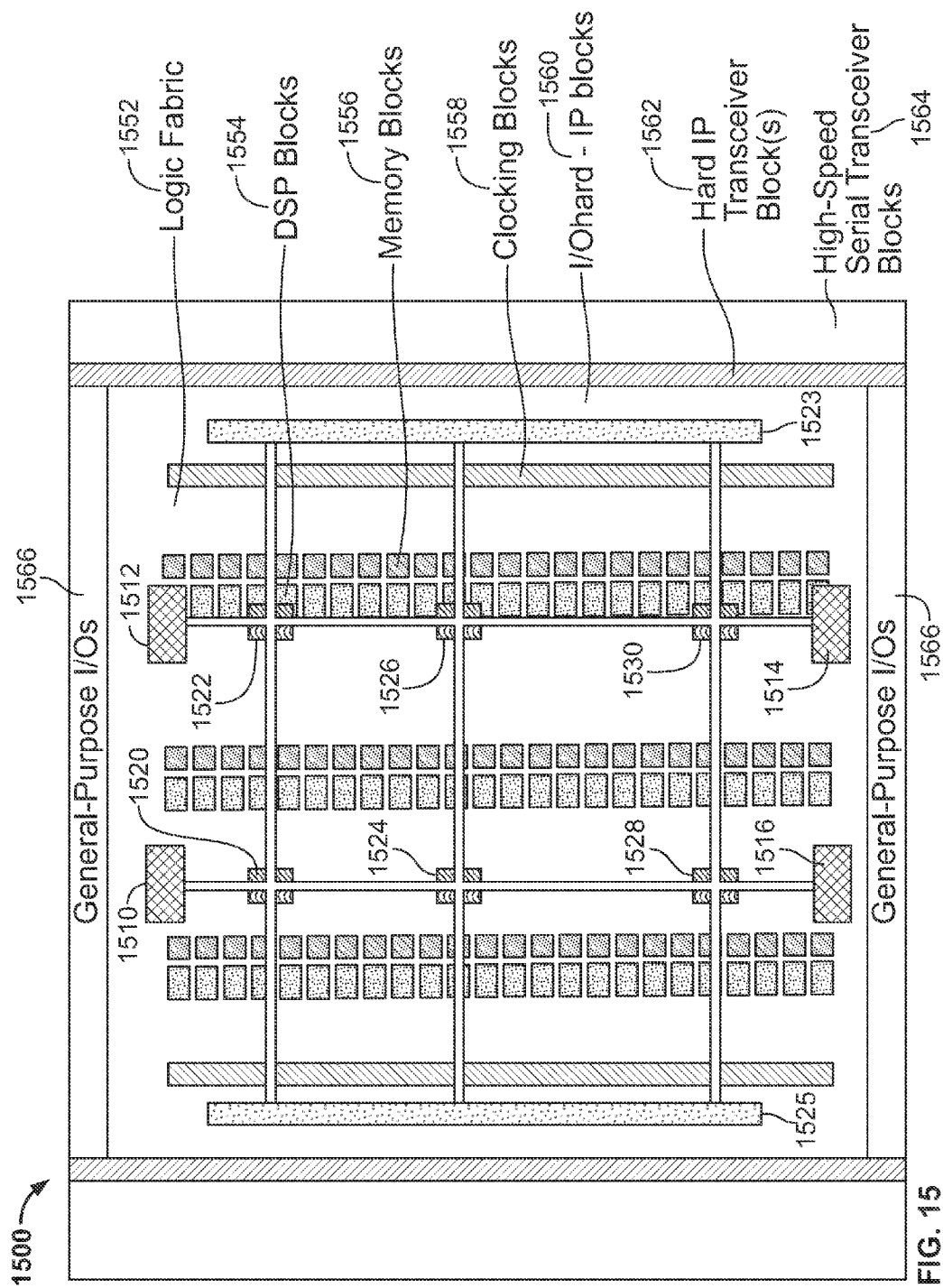
FIG. 15 depicts an illustrative floorplan of an FPGA with a NoC arbitration mechanism according to an implementation.

FIG. 15 illustrates such a case. In particular, FIG. 15 depicts a sample FPGA floorplan 1500 with hard-IP components, such as hard-IP blocks 1510, 1512, 1514, and 1516 and hard-IP interface stations 1523 and 1525. The hard-IP blocks 1510, 1512, 1514, and 1516 may be implemented as hardened controllers and/or physical interfaces to inputs and/or outputs of the device. The hard-IP blocks 1510, 1512, 1514, and 1516 are directly interfaced with NoC stations such as NOC stations 1520, 1522, 1524, 1526, 1528, and 1530. As illustrated in FIG. 15, the NoC is directly interfaced with a communication layer of the FPGA, in this example, the PCS of the high-speed serial interface on the right and left through interface stations 1523 and 1525, respectively.

Examples of the FPGA resources and I/O blocks with which the hard-IP blocks 1510, 1512, 1514, and 1516 or interface stations 1523 or 1525 may interface include logic fabric 1552, DSP blocks 1554, internal memory blocks 1556, clocking blocks 1558 (e.g., fractional PLLs), I/O hard-IP blocks 1560 (e.g., implementing embedded industry protocols such as PCI Express), hard-IP transceiver blocks 1562 (e.g., implementing physical layer protocols such as PCS) and high-speed serial transceiver blocks 1564. These resources are included for the purpose of illustration only, not limitation, and it will be understood that the hard-IP components of FIG. 15 may interface with other types of resources without departing from the scope of this disclosure.

The hardened components of FIG. 15 may function in all or in part as a station on the network, but could also have additional functionality. For example, the PCS interface stations could perform a dedicated function such as framing Ethernet packets and steering payload data and header data to different destinations in the device, or could append metadata as described earlier for multicast/broadcast or scheduling destinations and/or "worker tasks" on the device to read specific data.

The above use of the term "FPGA" is exemplary, and should be taken to include a multitude of integrated circuits, including, but not limited to, commercial FPGA devices, complex programmable logic device (CPLD) devices, configurable application-specific integrated circuit (ASSP) devices, configurable digital signal processing (DSP) and graphics processing unit (GPU) devices, hybrid application-specific integrated circuit (ASIC), programmable devices or devices which are described as ASICs with programmable logic cores or programmable logic devices with embedded ASIC or ASSP cores.

It will be apparent to one of ordinary skill in the art, based on the disclosure and teachings herein, that aspects of the disclosed techniques, as described above, may be implemented in many different forms of software, firmware, and hardware in the implementations illustrated in the figures. The actual software code or specialized hardware used to implement aspects consistent with the principles of the disclosed techniques are not limiting. Thus, the operation and behavior of the aspects of the disclosed techniques were described without reference to the specific software code—it being understood that one of ordinary skill in the art would be able to design software and hardware to implement the aspects based on the description herein.

What is claimed is:

1. A programmable integrated circuit comprising a plurality of Network-On-Chip (NoC) stations, wherein a first NoC station in the plurality of NoC stations receives a first clock input and comprises:

a first hard-IP interface comprising:

a first bidirectional connection that communicatively couples the first NoC station to a local logic area of the programmable integrated circuit; and a second bidirectional connection that communicatively couples the first NoC station to a second NoC station in the plurality of NoC stations neighboring the first NoC station; and a user-programmable first soft-IP interface that supports the first hard-IP interface and comprises Quality-of-Service (QoS) circuitry that provides functionality to the first NoC station based at least in part on a QoS parameter instantiated in the first soft-IP interface, wherein, when the QoS parameter comprises a data width of the first NoC station, the functionality comprises:

segmenting data received at the first NoC station with a width greater than the data width into smaller data units to facilitate processing by the first NoC station; and padding data received at the first NoC station with a width less than the data width into a padded data unit to facilitate processing by the first NoC station.

2. The programmable integrated circuit of claim 1, wherein:

the first soft-IP interface is instantiated via a software library function;

the software library function specifies the QoS parameter; and the software library function provides Register-transfer-level (RTL) code used to interface the first soft-IP interface with the first hard-IP interface.

3. The programmable integrated circuit of claim 1, wherein the plurality of NoC stations form a backbone routing network logically separated from other logic of the programmable integrated circuit.

4. The programmable integrated circuit of claim 1, wherein the QoS parameter comprises a bit rate, a latency, a delay, a jitter, a packet dropping probability, a data disposability, a data priority, a bit error rate, a buffer size, a store-and-forward policy, or any combination thereof.

5. The programmable integrated circuit of claim 1, wherein a third NoC station in the plurality of NoC stations comprises:

a second hard-IP interface comprising a unidirectional connection that communicatively couples the third NoC station to a fourth NoC station in the plurality of NoC stations neighboring the third NoC station; and a user-programmable second soft-IP interface that supports the second hard-IP interface.

6. The programmable integrated circuit of claim 1, wherein the first clock input comprises a higher frequency than a second clock input provided to the local logic area of the programmable integrated circuit.

7. An integrated circuit comprising a Network-On-Chip (NoC) station that facilitates data communication in the integrated circuit, wherein the NoC station comprises:

a hard-IP interface that communicatively couples the NoC station to a logic area of the integrated circuit, one or more neighboring NoC stations, or both; and a user-programmable soft-IP interface that, based at least in part on a first QoS parameter comprising data width of the NoC station:

segments first data received by the NoC station via the hard-IP interface into smaller data units to facilitate processing by the NoC station when width of the first data is greater than the data width; and pads second data received by the NoC station via the hard-IP interface to generate a padded data unit to facilitate processing by the NoC station when width of the second data is less than the data width.

8. The integrated circuit of claim 7, wherein:

the soft-IP interface is instantiated via a software library function;

the software library function specifies the first QoS parameter; and the software library function provides Register-transfer-level (RTL) code used to interface the soft-IP interface with the hard-IP interface.

9. The integrated circuit of claim 8, wherein the soft-IP interface supports the hard-IP interface based at least in part on a second QoS parameter comprising a bit rate, a latency, a delay, a jitter, a packet dropping probability, a data disposability, a data priority, a bit error rate, a buffer size, a store-and-forward policy, or any combination thereof.

10. The integrated circuit of claim 7, wherein the soft-IP interface controls flow of data streams to or from the NoC station by multiplexing the data streams, interleaving the data streams, or both based at least in part on a second QoS parameter comprising an available bandwidth parameter.

11. The integrated circuit of claim 7, wherein the data width comprises a data-only setting or a data-plus-metadata setting.

12. The integrated circuit of claim 7, wherein:

the NoC station comprises a buffer memory that stores data during a network busy condition; and the soft-IP interface sets size of the buffer memory based at least in part on a second QoS parameter.

13. A method for configuring a Network-On-Chip (NoC) station of an integrated circuit comprising a hard-IP interface and a soft-IP interface that supports the hard-IP interface, comprising:

instantiating, via a software library function, the soft-IP interface;

specifying, via the software library function, at least one Quality-of-Service (QoS) parameter of the NoC station to the soft-IP interface;

outputting, via the software library function, Register-transfer-level (RTL) used to interface the soft-IP interface and the hard-IP interface; and instructing, via the software library function, the soft-IP interface to configure based on the at least one QoS parameter to provide the NoC station functionality not otherwise provided by the hard-IP interface.

14. The method of claim 13, wherein the software library function comprises a MegaFunction.

15. The method of claim 13, wherein:

the at least one QoS parameter comprises a buffer size parameter; and instructing the soft-IP interface to configured comprises instructing the soft-IP interface to adjust size of a buffer memory of the NoC station based at least in part on the buffer size parameter.

16. The method of claim 13, wherein:

the at least one QoS parameter comprises an available bandwidth parameter; and the functionality comprises regulating streams of data to or from the NoC station based at least in part on the available bandwidth parameter.

17. The method of claim 16, wherein regulating the streams of data comprises multiplexing the streams of data, interleaving the streams of data, or both.

18. The method of claim 13, wherein the one or more QoS parameters comprise a bit rate, a latency, a delay, a jitter, a packet dropping probability, a data disposability, a data priority, a bit error rate, a buffer size, a store-and-forward policy, or any combination thereof.

19. The method of claim 13, wherein the software library function comprises a user interface, software, a supporting implementation, or any combination thereof.

20. A method for configuring a Network-On-Chip (NoC) station of an integrated circuit comprising a hard-IP interface and a soft-IP interface that supports the hard-IP interface, comprising:

instantiating, via a software library function, the soft-IP interface;

specifying, via the software library function, at least one Quality-of-Service (QoS) parameter of the NoC station to the soft-IP interface, wherein the at least one QoS parameter comprises a data width of the NoC station; and instructing, via the software library function, the soft-IP interface to configure based on the at least one QoS parameter to provide the NoC station functionality not otherwise provided by the hard-IP interface, wherein the functionality comprises:

segmenting data received at the NoC station of a width greater than the data width into smaller data units to facilitate processing by the NoC station; and padding data received at the NoC station of a width less than the data width into a padded data unit to facilitate processing by the NoC station.

* * * * *